United States Patent
Kawiecki et al.

(10) Patent No.: US 12,243,436 B2
(45) Date of Patent: Mar. 4, 2025

(54) PROBABILITY-BASED OBSTACLE AVOIDANCE

(71) Applicant: THE BOEING COMPANY, Chicago, IL (US)

(72) Inventors: Grzegorz Marian Kawiecki, El Escorial (ES); Wojciech Dabrowski, Gdynia (PL); Szymon Jan Trabala, Sopot (PL)

(73) Assignee: THE BOEING COMPANY, Arlington, VA (US)

( * ) Notice: Subject to any disclaimer, the term of this patent is extended or adjusted under 35 U.S.C. 154(b) by 421 days.

(21) Appl. No.: 17/516,239

(22) Filed: Nov. 1, 2021

(65) Prior Publication Data

US 2022/0223059 A1     Jul. 14, 2022

Related U.S. Application Data

(60) Provisional application No. 63/135,227, filed on Jan. 8, 2021.

(51) Int. Cl.
| | |
|---|---|
| *G08G 5/04* | (2006.01) |
| *G06N 7/01* | (2023.01) |
| *G06N 20/00* | (2019.01) |
| *G08G 5/00* | (2006.01) |
| *B64U 10/14* | (2023.01) |

(52) U.S. Cl.
CPC ............... *G08G 5/045* (2013.01); *G06N 7/01* (2023.01); *G06N 20/00* (2019.01); *G08G 5/003* (2013.01); *G08G 5/006* (2013.01); *G08G 5/0069* (2013.01); *B64U 10/14* (2023.01); *B64U 2201/10* (2023.01)

(58) Field of Classification Search
CPC ........ G08G 5/045; G08G 5/003; G08G 5/006; G08G 5/0069; G06N 20/00; G06N 7/01
See application file for complete search history.

(56) References Cited

U.S. PATENT DOCUMENTS

| | | | |
|---|---|---|---|
| 9,361,591 B2 * | 6/2016 | Na ........................... | G06N 5/04 |
| 9,542,849 B1 | 1/2017 | Bertram et al. | |
| 9,632,502 B1 * | 4/2017 | Levinson ............... | G08G 1/166 |

(Continued)

FOREIGN PATENT DOCUMENTS

| | | |
|---|---|---|
| CN | 109116867 A | 1/2019 |
| EP | 3508869 A1 | 7/2019 |

OTHER PUBLICATIONS

"The Drone Analyst Breaks Down Sense and Avoid," The Drone Analyst Breaks Down Sense and Avoid—Drone Business Center, https://dronebusiness.center/drone-analyst-breaks-sense-avoid-12329/, Sep. 22, 2016, pp. 1-4.

(Continued)

*Primary Examiner* — Ramsey Refai
(74) *Attorney, Agent, or Firm* — Moore IP Law (57) ABSTRACT

A system includes an interface configured to receive sensor data corresponding to a potential hazard associated with a travel path of a vehicle. The system also includes an obstacle database including probability distributions of potential obstacles. The system further includes one or more processors coupled to the interface and configured to generate a probability index associated with the potential hazard and to determine whether to modify the travel path based on the probability index and the probability distributions.

20 Claims, 5 Drawing Sheets

(56) References Cited

U.S. PATENT DOCUMENTS

| | | | |
|---|---|---|---|
| 11,553,303 | B2 | 1/2023 | Hasegawa et al. |
| 2014/0122409 | A1 | 5/2014 | Na et al. |
| 2015/0206438 | A1* | 7/2015 | Marsden ............... G08G 5/065 |
| | | | 701/301 |
| 2017/0193830 | A1* | 7/2017 | Fragoso ................ G08G 5/045 |
| 2019/0196007 | A1 | 6/2019 | Fucke et al. |
| 2021/0173415 | A1* | 6/2021 | Cajias ................... G06V 20/64 |

OTHER PUBLICATIONS

Banerjee, Mandrita, et al., A blockchain future for internet of things security: a position paper, Digital Communications and Networks, 2018, vol. 4, pp. 149-160.

Choi, Jeong-Min et al., "Self-learning navigation algorithm for vision-based mobile robots using machine learning algorithms," Journal of Mechanical Science and Technology, 2011, vol. 25, Issue 1, pp. 247-254.

Consumer drone shipments worldwide 2015-2021, Statista, https://www.statista.com/statistics/608887/consumer-drone-shipments-worldwide/, pp. 1-2.

Dayton, John et al., "Obstacle Avoidance System for UAVs using Computer Vision," California Polytechnic University, Pomona, CA 91768, Mar. 7, 2014, pp. 1-8.

Dima, Cristian et al., "Classifier Fusion for Outdoor Obstacle Detection," Engineering Computer Science, IEEE International Conference on Robotics and Automation, 2004, pp. 1-7.

Dima, Cristian, et al., "Active Learning for Outdoor Obstacle Detection," The Robotics Institute, Carnegie Mellon University, Jun. 2005, pp. 1-8.

Gellerman, Nicholas et al., "A Terrain Avoidance Algorithm Based on the Requirements of Terrain Awareness and Warning Systems," 2015 IEEE Aerospace Conference, 2015, pp. 1-6, doi: 10.1109/AERO.2015.7119160.

Johnsson, Julie et al., "Boeing Is Getting Ready to Sell "Flying Taxis" In the Next Decade," The Washington Post, Mar. 6, 2018, pp. 1-6.

Kulic, Ranka, et al., "Autonomous Vehicle Obstacle Avoiding and Goal Position Reaching by Virtual Obstacle," Proceedings of the European Control Conference, Jul. 2-5, 2007, pp. 2484-2491.

Linn, Allison, "Flying car not as far-fetched a fantasy as you might think," Honoluluadvertiser.com, Aug. 29, 2004, Obstacle Avoidance System for UAVs using Computer Vision. 1 pg.

Michels, Jeff et al. "High Speed Obstackle Avoidance using Monocular Vision and Reinforcement Learning," Conference: Machine Learning, Proceedings of the Twenty-Second International Conference (ICML 2005), Bonn, Germany, Aug. 7-11, 2005, pp. 1-8.

Nelson, Chris, "Airbus flying cars accelerate city transport revolution," TheNationalNews.com, Apr. 10, 2017, https://www.thenationalnews.com/business/airbus-flying-cars-accelerate-city-transport-revolution-1.56434, pp. 1-5.

Otto, Robert P., "Small Unmanned Aircraft Systems (SUAS) Flight Plan: 2016-2036," U.S. Air Force, pp. 1-94.

Outchakoucht, Aissam et al. "Dynamic Access Control Policy based on Blockchain and Machine Learning for the Internet of Things," International Journal of Advanced Computer Science and Applications, vol. 8, No. 7, 2017, pp. 417-424.

Extended European Search Report for Application No. 21213364.9 dated Jun. 3, 2022, 8 pgs.

Aguilar, Wilbert G., et al. "Obstacle avoidance for low-cost UAVs," 2017 IEEE 11th Inernational Conference on Semantic Computing, pp. 1-6.

Branch, Arthur et al., "A Design Study for the Safe Integration of Unmanned Aerial Systems into the National Airspace System," 2016 IEEE Systems and Information Engineering Design Conference (SIEDS '16), pp. 1-6.

Richards, Blin et al., "Obstacle Avoidance System for UAVs Using Computer Vision," California State Polytechnic University, Pomona, CA, Mar. 7, 2014, http://hdl.handle.net/10211.3/119764; pp. 1-8.

Unknown, "The Business of Luxurious Cars: Must-Read Reports and Analysis," https://web.archive.org/web/20170720171009/http://www.reportlinker.com/ci02180/Luxury-Automobile.html, retrieved Oct. 4, 2024, pp. 1-7.

Anonymous, "$700 Billion Land, Water, Air Autonomous Vehicles Market 2017-2037," Research and Markets, Oct. 27, 2017, https://www.prnewswire.com/news-releases/700-billion-land-water-air-autonomous-vehicles-market-2017-2037-300544772.html, retrieved Jul. 3, 2024.

Anonymous, "Disruptive Mobility portfolio unites future aerospace vehicle development," Boeing News Now, Mar. 16, 2018, http://active.boeing.com/boeing-now/story.cfm? SID=14154&key=E5F795DC98A2421BF72A740EB7104D4509648632C625F0EA7C22B27F72D621F9, 2 pages.

Ebel, Thomas, "Obstacle Databases for Instrument Flight: A risk Analysis", Technical Notes, Journal of Aerospace Information Systems, vol. 1, No. 10, Oct. 2019, pp. 1-4.

* cited by examiner

PROBABILITY-BASED OBSTACLE AVOIDANCE

CROSS-REFERENCE TO RELATED APPLICATIONS

The present application claims priority from U.S. Provisional Patent Application No. 63/135,227 entitled "PROBABILITY-BASED OBSTACLE AVOIDANCE," filed Jan. 8, 2021, the contents of which are incorporated by reference in their entirety.

FIELD OF THE DISCLOSURE

The subject disclosure is generally related to obstacle avoidance for vehicles.

BACKGROUND

As autonomous vehicle become increasingly utilized, air space congestion due to increased air traffic is predicted to overwhelm resources that are currently used for obstacle avoidance. The development of obstacle avoidance systems has focused on efficient sensor systems and associated software. The computational resources needed to adequately process on-board sensor-created data results in size, weight, and power challenges for autonomous vehicle design.

Some obstacle avoidance systems include an obstacle database and consolidate obstacle information that is dynamically acquired using on-board system with information on terrain and stationary man-made objects from the obstacle database. However, such conventional obstacle databases are typically focused on stationary objects, such as terrain and man-made obstacles, and the precision of information stored in such databases can vary depending on the covered area, the information provider, or both. Although conventional obstacle databases enable avoidance of stationary obstacles, detection and avoidance of non-stationary, uncooperative obstacles requires implementation of additional components for obstacle detection. However, the underlying incompatibility of dynamic obstacle detection data with stationary obstacle database data presents challenges for on-board obstacle avoidance systems.

SUMMARY

In a particular implementation, a system includes an interface configured to receive sensor data corresponding to a potential hazard associated with a travel path of a vehicle. The system also includes an obstacle database including probability distributions of potential obstacles. The system further includes one or more processors coupled to the interface and configured to generate a probability index associated with the potential hazard and to determine whether to modify the travel path based on the probability index and the probability distributions.

In another particular implementation, a method includes receiving, by one or more processors, sensor data corresponding to a potential hazard associated with a travel path of a vehicle. The method also includes generating, by the one or more processors, a probability index associated with the potential hazard. The method further includes determining, by the one or more processors, whether to modify the travel path based on the probability index.

In another particular implementation, a non-transitory, computer-readable medium stores instructions that, when executed by a processor, cause the processor to initiate, perform, or control operations that include receiving sensor data corresponding to a potential hazard associated with a travel path of a vehicle. The operations also include generating a probability index associated with the potential hazard. The operations further include determining whether to modify the travel path based on the probability index.

The features, functions, and advantages described herein can be achieved independently in various implementations or may be combined in yet other implementations, further details of which can be found with reference to the following description and drawings.

DETAILED DESCRIPTION

Aspects disclosed herein present systems and methods of probability-based obstacle avoidance. Dynamic obstacle detection in conventional obstacle avoidance systems relies on extensive sensor data processing that impacts the size, weight, and power requirement of vehicles. Further, conventional dynamic obstacle detection systems are not natively compatible with conventional stationary obstacle databases, which presents challenges for integrating dynamic detection data with obstacle database data in on-board obstacle avoidance systems.

As disclosed herein, systems and methods of probability-based collision avoidance include a comprehensive obstacle database system in which obstacles are defined in terms of probability distributions. In an example, an obstacle database includes spatial and temporal parameters associated with probability distributions of potential obstacles, where spatial probability distributions enable evaluation of vehicle trajectories in terms of risk, and temporal distributions additionally provide time-based characteristics of temporary events. The obstacle database can include any objects or events that may affect vehicle safety, such as severe weather areas, man-made structures, stationary or non-stationary natural obstacles, etc. In some implementations, the database-stored information is configured to be efficiently compared to (e.g., subtracted from) the situational picture generated by an on-board obstacle detection sensor system, reducing the processing load of on-board resources by focusing analysis on potential hazards that are detected by detection sensors but that are not included in the obstacle database.

The disclosed systems and methods of probability-based collision avoidance improve the efficiency of obstacle avoidance systems that can be implemented in vehicles, such as unmanned aircraft and autonomous personal air transport vehicles. The probability-based obstacle database enables reduction of workload for on-board obstacle avoidance systems and can therefore improve vehicle safety beyond conventional basic obstacle detection and avoidance processes. The probability-based obstacle database enables storage of comprehensive and timely information about potentially threatening objects and phenomena that might otherwise need to be processed by limited on-board resources. The disclosed techniques are applicable to all classes of vehicles, and particularly to autonomous air vehicles.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Particular implementations are described herein with reference to the drawings. In the description, common features are designated by common reference numbers throughout the drawings. In some drawings, multiple instances of a particular type of feature are used. Although these features are physically and/or logically distinct, the same reference number is used for each, and the different instances are distinguished by addition of a letter to the reference number. When the features as a group or a type are referred to herein e.g., when no particular one of the features is being referenced, the reference number is used without a distinguishing letter. However, when one particular feature of multiple features of the same type is referred to herein, the reference number is used with the distinguishing letter. For example, referring to FIG. 3, multiple potential trajectories 340 are illustrated and associated with reference numbers 340A, 340B, 340C, 340D, and 340E. When referring to a particular one of these trajectories, such as a trajectory 340A, the distinguishing letter "A" is used. However, when referring to any arbitrary one of these trajectories or to these trajectories as a group, the reference number 340 is used without a distinguishing letter.

As used herein, various terminology is used for the purpose of describing particular implementations only and is not intended to be limiting. For example, the singular forms "a," "an," and "the" are intended to include the plural forms as well, unless the context clearly indicates otherwise. Further, the terms "comprise," "comprises," and "comprising" are used interchangeably with "include," "includes," or "including." Additionally, the term "wherein" is used interchangeably with the term "where." As used herein, "exemplary" indicates an example, an implementation, and/or an aspect, and should not be construed as limiting or as indicating a preference or a preferred implementation. As used herein, an ordinal term e.g., "first," "second," "third," etc. used to modify an element, such as a structure, a component, an operation, etc., does not by itself indicate any priority or order of the element with respect to another element, but rather merely distinguishes the element from another element having a same name but for use of the ordinal term. As used herein, the term "set" refers to a grouping of one or more elements, and the term "plurality" refers to multiple elements.

As used herein, "generating," "calculating," "using," "selecting," "accessing," and "determining" are interchangeable unless context indicates otherwise. For example, "generating," "calculating," or "determining" a parameter or a signal can refer to actively generating, calculating, or determining the parameter or the signal or can refer to using, selecting, or accessing the parameter or signal that is already generated, such as by another component or device. As used herein, "coupled" can include "communicatively coupled," "electrically coupled," or "physically coupled," and can also or alternatively include any combinations thereof. Two devices or components can be coupled e.g., communicatively coupled, electrically coupled, or physically coupled directly or indirectly via one or more other devices, components, wires, buses, networks e.g., a wired network, a wireless network, or a combination thereof, etc. Two devices or components that are electrically coupled can be included in the same device or in different devices and can be connected via electronics, one or more connectors, or inductive coupling, as illustrative, non-limiting examples. In some implementations, two devices or components that are communicatively coupled, such as in electrical communication, can send and receive electrical signals, digital signals or analog signals directly or indirectly, such as via one or more wires, buses, networks, etc. As used herein, "directly coupled" is used to describe two devices that are coupled e.g., communicatively coupled, electrically coupled, or physically coupled without intervening components.

Figure 1:
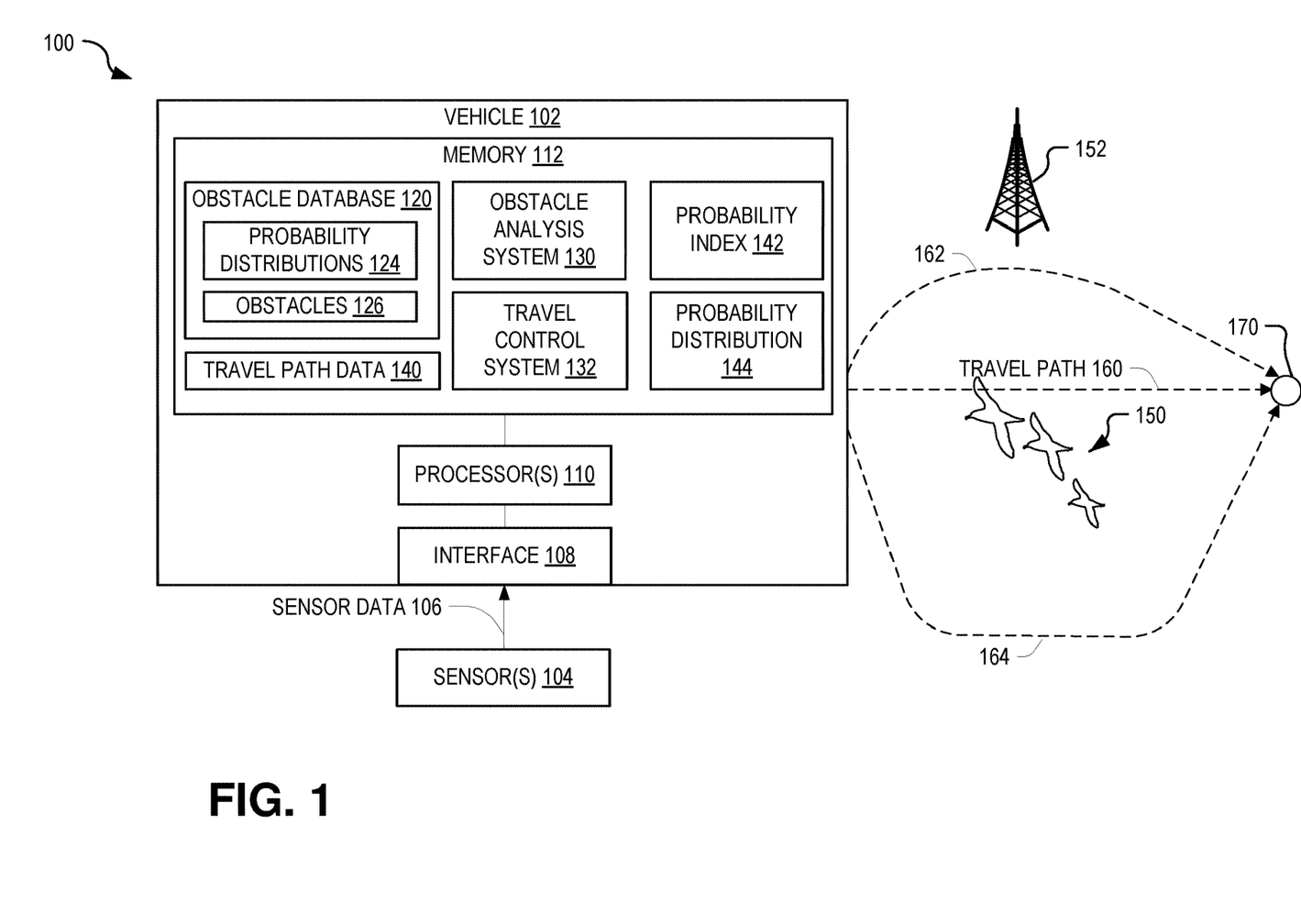
FIG. 1 is a diagram that illustrates an example system configured to perform probability-based obstacle avoidance.

FIG. 1 depicts an example of an example system 100 including a vehicle 102 that is configured to perform probability-based obstacle avoidance. As illustrated, the vehicle 102 corresponds to an unmanned aerial vehicle (UAV) traveling to a destination 170 along a travel path 160. A potential hazard 150 along the travel path 160 is represented as a flock of birds (e.g., a non-stationary natural obstacle). Another potential hazard 152 is represented as an antenna (e.g., a stationary man-made obstacle). As used herein, a "hazard" refers to an object (e.g., structure, terrain, another object or condition, etc.) for which a collision between the vehicle 102 and the object would endanger the safety of the vehicle 102. A "potential hazard" refers to an object that is detected by the vehicle 102, whether or not the object represents a probable collision risk by being directly along the travel path 160.

The vehicle 102 includes an interface 108 coupled to one or more sensors 104, one or more processors 110 coupled to the interface 108, and a memory 112 coupled to the one or more processors 110. The one or more sensors 104 are coupled to the vehicle 102 (e.g., a sensor package) and configured to generate sensor data 106 corresponding to an environment of the vehicle 102, including any potential hazards that may be in the vicinity of the vehicle 102. In the illustrated example, the sensor data 106 includes data indicative of the potential hazards 150 and 152. The one or more sensors 104 can include one or more cameras to capture image or video data, radar devices, lidar devices, ultrasound devices, antennas to receive beacons or other signal from other vehicles or stationary emitters, one or more other sensors to detect the environment of the vehicle 102, or any combination thereof. In some implementations, the one or more sensors 104 further include one or more positional or motion sensors, such as one or more compasses, altimeters, gyroscopes, accelerometers, positioning systems (e.g., a global positioning system (GPS) receiver), one or more other sensors, or any combination thereof. The interface 108 is configured to receive the sensor data 106 corresponding to the potential hazards.

The one or more processors 110 can be implemented as a single processor or as multiple processors, such as in a multi-core configuration, a multi-processor configuration, a distributed computing configuration, a cloud computing configuration, or any combination thereof. In some implementations, one or more portions of the vehicle 102 are implemented using dedicated hardware, firmware, or a combination thereof.

The memory 112 includes an obstacle database 120, an obstacle analysis system 130, a travel control system 132, travel path data 140, a probability index 142, and a probability distribution 144. The obstacle analysis system 130 includes instructions that are executable by the one or more processors 110 to analyze the sensor data 106 to detect one or more potential hazards and to generate a probability index 142 associated with a potential hazard. In some implementations, a "probability index" indicates an absolute or relative likelihood or probability of an undesirable outcome, such as a collision (e.g., with another vehicle, a terrain feature, or the ground) or the vehicle 102 entering an unpermitted region (e.g., entering within a prohibited distance from another vehicle or crossing into a restricted airspace).

A probability index for an obstacle or a hazard represents an estimated likelihood that the vehicle 102 will have an undesirable outcome due to interaction with that hazard, also referred to as "encountering" that hazard. A cumulative probability index for a travel path of the vehicle 102 represents an estimated likelihood that the vehicle 102 will have an undesirable outcome, such as encountering one or more obstacles or hazards, while travelling along the travel path. However, in other implementations, a probability index indicates an estimated safety metric for the vehicle 102 (e.g., an estimated likelihood of a desirable outcome).

The travel path data 140 is stored in the memory 112 and represents a planned path of travel for the vehicle 102. For example, the travel path data 140 can indicate a sequence of headings, bearings, speeds, distances, altitudes, waypoints, or any other information representing a planned path of travel for the vehicle 102. In some implementations, the travel path data 140 is determined based on known obstacles prior to initiating travel, such as to reduce or minimize the likelihood of collision with any known obstacles based on contents of the obstacle database 120. As illustrated, the motion of the vehicle 102 following the stored travel path data 140 is graphically represented as the travel path 160. The stored travel path data 140 can be dynamically modified during travel of the vehicle 102, such as in response to detecting one or more potential hazards that affect a likelihood of collision or other undesirable outcomes for the vehicle 102.

As used herein, a "trajectory" of the vehicle 102 indicates a direction of travel of the vehicle 102. Because changing the trajectory of the vehicle 102 also results in changing the travel path of the vehicle 102, and changing the travel path results in changing the trajectory (or future trajectory) of the vehicle 102, the terms "travel path" and "trajectory" are used interchangeably herein.

The obstacle analysis system 130 uses the probability index 142 to determine whether to adjust the travel path 160 to reduce a likelihood of the vehicle 102 encountering a detected hazard, as described further below. The travel control system 132 includes instructions that are executable by the one or more processors 110 to control flight operations of the vehicle 102, such as to cause the vehicle 102 to travel in accordance with the travel path 160.

The obstacle database 120 includes records indicating probability distributions 124 of potential obstacles 126. In an example, the potential obstacles 126 correspond to at least one of: a stationary natural object, a stationary man-made object, a mobile natural object, a mobile man-made object, hazardous weather, a geofenced region, or a prohibited travel region. Examples of various potential obstacles are described further with reference to FIG. 3. Each of the probability distributions 124 includes probability information corresponding to each of the potential obstacles 126.

In some implementations, a probability distribution for a particular obstacle represents an estimated spatial probability of encountering the obstacle. In an illustrative example, the probability distribution of the potential hazard 152 is represented as having a "1" value (i.e., 100% likelihood of encountering the potential hazard 152) within a cylindrical region of space enclosing the antenna, and having a "0" value (i.e., 0% likelihood of encountering the potential hazard 152) outside of the cylindrical volume. For permanent obstacles, the probability distribution is time-invariant. In some implementations, for mobile or temporary obstacles, the probability distribution is time-dependent. To illustrate, the probability distribution for a construction crane may have a "0" value for times prior to a scheduled start of construction and following a scheduled end of construction and non-zero values based on spatial location during the scheduled period of construction.

The one or more processors 110 are configured to generate a probability index 142 associated with the potential hazard 150. To illustrate, the obstacle analysis system 130 processes the sensor data 106, detects the potential hazard 150, and estimates the probability of the vehicle 102 encountering the potential hazard 150 based on an estimated size, trajectory, and/or speed of the potential hazard 150, and further based on the location, trajectory, and/or speed of the vehicle 102 along with estimated future locations of the vehicle 102 based on the travel path data 140.

In some implementations, the probability index 142 corresponds to a likelihood of the vehicle 102 encountering the potential hazard 150 along the travel path 160. In some implementations, the probability index 142 is determined based on a spatial and temporal probability distribution 144 associated with the potential hazard 150. In an example, the obstacle analysis system 130 processes the sensor data 106 to estimate the probability distribution 144 of the potential hazard 150.

In an illustrative example, the one or more processors 110 are configured to filter out potential hazards detected in the sensor data 106 that represent known obstacles. In an example, the obstacle analysis system 130 is configured to compare the detected potential hazard 152 to the potential obstacles 126 and to determine that the potential hazard 152 matches a potential obstacle 126 in the obstacle database 120, such as based on a signature (e.g., visual appearance or radar signature) and location. In response to determining that the potential hazard 152 matches a known obstacle, the obstacle analysis system 130 bypasses further processing of the sensor data 106 corresponding to the potential hazard 152 and relies on the information in the obstacle database 120, thus conserving processing resources for processing of unknown hazards. In addition, because the travel path 160 is determined based on the known potential obstacles 126 in the obstacle database 120, detection of the potential hazard 152 does not trigger re-evaluation of the travel path 160.

In contrast, the obstacle analysis system 130 compares the detected potential hazard 150 to the potential obstacles 126 and, in response to determining that the detected potential hazard 150 does not match a potential obstacle 126 of the obstacle database 120, generate the probability index 142 associated with the detected potential hazard 150. In some implementations, the one or more processors 110 (e.g., the obstacle analysis system 130) are configured to apply machine learning to determine the probability distribution 144 associated with the potential hazard 150.

The obstacle analysis system 130 is configured to determine whether to modify the travel path 160 based on the probability index 142 and the probability distributions 124. In an example, re-evaluation of the travel path 160 is performed as a real-time dynamic process during travel of the vehicle 102 because of unknown obstacles/hazards which may affect the travel path 160 and that are detected by on-board systems, such as the potential hazard 150. The travel path 160 can be dynamically adjusted due to other detecting hazards which were not initially used for the initial probability index computations when determining the travel path 160.

The obstacle analysis system 130 is configured to, responsive to determining that the potential hazard 150 does not match any of the potential obstacles 126 of the obstacle database 120, compute a first cumulative probability index associated with the travel path 160, compute a second cumulative probability index associated with a first alternate travel path 162, and compute a third cumulative probability index associated with a second alternate travel path 164. The obstacle analysis system 130 is configured to determine whether to transition to the first alternate travel path 162 or the second alternate travel path 164 at least partially based on a comparison between the first cumulative probability index, the second cumulative probability index, and the third cumulative probability index. In some implementations, the one or more processors 110 are configured to apply machine learning to determine whether to modify the travel path 160. An example of determining cumulative probability indices and selecting updated travel paths is described further with regard to FIG. 3.

During operation in accordance with a particular example, the initial travel path 160 to the destination 170 is generated based on the probability distributions 124 of the potential obstacles 126 in the obstacle database 120. For example, the one or more processors 110 (or another processing device, such as a dedicated flight control server) determines one or more possible travel paths to the destination 170 having the lowest computed probability of encountering any of the potential obstacles 126, selects the travel path 160 as the most efficient (e.g., based on shortest distance, least fuel consumption, fastest travel time, etc.) of the determined travel paths, and stores the travel path data 140 corresponding to the selected travel path 160.

The vehicle 102 initiates travel to the destination 170 according to the travel path data 140. During travel, the obstacle analysis system 130 operates continuously to process the sensor data 106 to detect potential hazards. In response to detecting the potential hazard 150 and the potential hazard 152, the obstacle analysis system 130 compares signatures of the potential hazards 150 and 152 to entries in the obstacle database 120. In response to determining that the potential hazard 152 matches the signature and location of one of the potential obstacles 126 in the obstacle database 120, the obstacle analysis system 130 bypasses further processing of the sensor data 106 corresponding to the potential hazard 152.

In response to determining that the potential hazard 150 does not match the signature of any of the potential obstacles 126 in the obstacle database 120, the obstacle analysis system 130 estimates the probability distribution 144 for the potential hazard 150. For example, the sensor data 106 is processed to estimate a location, altitude, heading, and speed for the flock of birds, and extrapolates probable locations of the flock into the future, with diminishing probability indicating increasing uncertainty in future projections. In some implementations, the obstacle analysis system 130 creates a new entry in the obstacle database 120 corresponding to the potential hazard 150.

In some implementations, the obstacle analysis system 130 determines the probability index 142 of the vehicle 102 encountering the flock of birds based on the travel path data 140 and the probability distribution 144. If the probability index 142 is below a threshold (e.g., 0.05) indicating a very low probability of collision if the vehicle 102 continues along the travel path 160, no adjustment to the travel path data 140 is made. If the probability index 142 exceeds the threshold, the obstacle analysis system 130 begins evaluating alternate travel paths, such as the alternate travel paths 162 and 164, to identify an updated travel path to the destination 170 that has a reduced or minimized probability of encountering any obstacle, including the flock of birds.

In some cases, the obstacle analysis system 130 selects an updated travel path further based on comparing efficiencies of the candidate travel paths. For example, if both the first alternate travel path 162 and the second alternate travel path 164 have equal, or approximately equal, estimated probability of encountering a known obstacle (including the potential hazard 150), then the first alternate travel path 162 is chosen as having the shorter distance, requiring less fuel or battery consumption and resulting in shorter delay from the originally estimated arrival time at the destination 170. The travel path that is selected is used to update the travel path data 140, which is used by the travel control system 132 to continue to the destination 170.

Because in some implementations the obstacle database 120 is entirely probability distribution-based, obstacle presence is defined in terms of probability with probability distribution, different types of obstacle data from different sources and in different native formats can be seamlessly combined and processed from the obstacle database 120. The obstacles' probability distributions depend on time, location, and non-stationary obstacles' intent, among other factors. Intent, such as indication of flight path or trajectory, can be provided by cooperative obstacles or estimated for uncooperative ones. During evaluation of alternative travel paths, a probability index is estimated for each database record to estimate temporal probability of an obstacle's existence at a specific future time or a specific period of time.

Thus, the system 100 enables use of different types of input data regarding potential obstacles, such as for the purpose of optimizing the flight path of a UAV, that are represented in the obstacle database 120 using a common format (e.g., the probability distributions 124). To illustrate, using the probability distributions 124 enables different types of obstacle data to be represented and analyzed according to a uniform scheme, independent of whether the underlying obstacle corresponds to weather data, flight data of other vehicles, terrain data, or physical or temporal restrictions such as a temporarily restricted airspace over a sporting event, as illustrative, non-limiting examples. As a result, the one or more processors 110 can generate and evaluate updated travel paths faster and with less processing resources as compared to evaluating multiple different types of data of different potential hazards from different sources and using different formats. In addition, comparing potential hazards detected via the sensor data 106 to the obstacles 126 enables faster results using fewer resources when encountering unexpected hazards by bypassing processing of detected potential hazards that match known entries in the obstacle database 120. Vehicle performance and safety is thus enhanced when the vehicle 102 encounters an unexpected hazard.

Although FIG. 1 illustrates particular examples for clarity of explanation, such examples are not to be considered as limitations. For example, although the one or more sensors 104 are illustrated coupled to the vehicle 102, in other implementations the interface 108, the obstacle database 120, the one or more sensors 104, and the one or more processors 110 are integrated into the vehicle 102. As another example although the obstacle analysis system 130 is described as performing comparisons of potential hazards detected via the sensor data 106 to entries in the obstacle database 120 and bypassing processing of potential hazards matching entries in the obstacle database 120, in other implementations the obstacle analysis system 130 does not bypass processing of potential hazards matching entries in the obstacle database 120 and instead processes all detected potential hazards as potentially unexpected obstacles.

Figure 2:
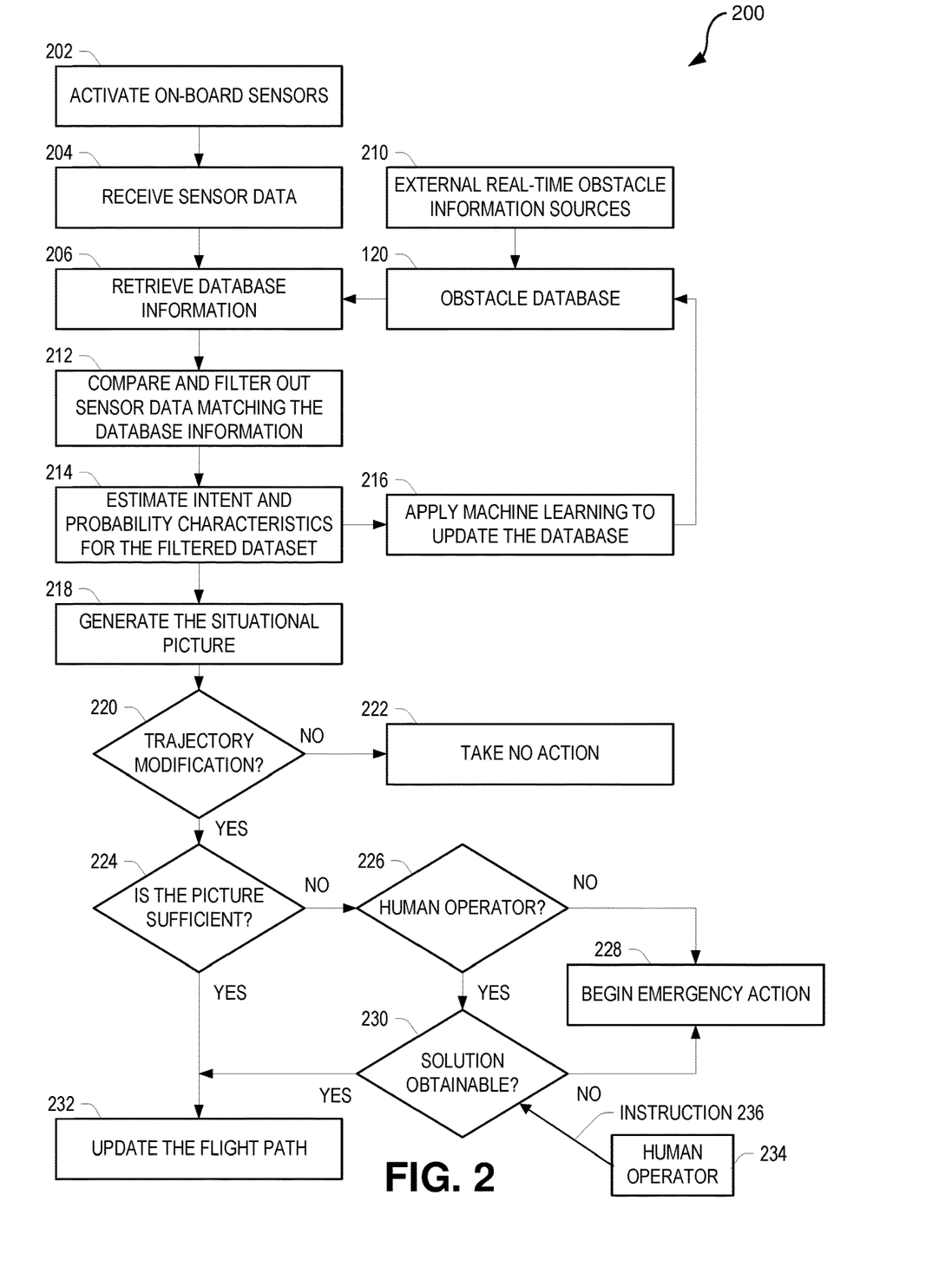
FIG. 2 is a diagram that illustrates a flow chart of an example of a method of operation of the system of FIG. 1.

FIG. 2 illustrates an example of a method 200 of probability-based object avoidance that can be performed by the vehicle 102. The method 200 includes, at block 202, activating on-board sensors, such as the one or more sensors 104. The method 200 includes, at block 204, receiving sensor data (e.g., radar returns and image data), such as the sensor data 106 received at the one or more processors 110 via the interface 108.

The method 200 includes, at block 206, retrieving database information from the obstacle database 120, which can be updated based on external real-time obstacle information sources 210. The method 200 includes, at block 212, comparing and filtering out sensor data matching the database information.

The method 200 includes, at block 214, estimating intent and probability characteristics for the filtered dataset. The method 200 includes, at block 216, applying machine learning to update the obstacle database 120 to include entries corresponding to hazards detected in the filtered dataset.

The method 200 includes, at block 218, evaluating the hazards in the filtered dataset, the obstacles in the obstacle database 120, or both, to generate a situational picture. In an example, the process of taking "situational snapshots" is repeated with a pre-defined frequency. If the "snapshot" does not show any imminent collision threats, no action is taken, and the trajectory is not modified.

The method 200 includes, at block 220, determining whether to modify the trajectory of the vehicle based on the situational picture. In response to determining not to modify the trajectory, the method 200 includes, at block 222, taking no action regarding modifying the trajectory.

Otherwise, in response to determining to modify the trajectory, the method 200 includes, at block 224, determining whether the situational picture is sufficient to determine how to modify the trajectory to avoid the hazard(s) detected in the filtered dataset. In response to the situational picture being sufficient, the method 200 includes, at block 232, updating the flight path of the vehicle.

If the situational picture is not sufficient, the method 200 includes, at block 226, determining whether a human operator is available or "in the loop" to provide instructions for the vehicle. In response to a human operator 234 being in the loop and available to provide an instruction 236 for the vehicle, the method 200 includes, at block 230, determining whether a solution is obtainable regarding how to modify the trajectory to avoid the hazard(s) detected in the filtered dataset. If a solution is obtainable, the method 200 advances to updating the flight path of the vehicle, at block 232. If no human operator is available, or if the human operator 234 is unable to resolve the situation, the method 200 includes, at block 228, initiating an emergency action, e.g., landing, or triggering a ballistic parachute deployment.

The system 100 and the method 200 enable several benefits, in accordance with various aspects. In a particular aspect, use of the obstacle database 120 results in obstacle-related, on-board processing being performed for subsets of sensor-acquired data that cannot be associated with obstacle-related information residing in the obstacle database 120. In a particular aspect, the obstacle database 120 is entirely probability distribution-based, and obstacle presence is defined in terms of probability with probability distribution. That distribution depends, at least partially, on time, the location, and the intent of non-stationary obstacles. The intent can be provided by cooperative obstacles or estimated for uncooperative ones.

In a particular aspect, the distinction between stationary objects and non-stationary objects or temporary objects is expressed in terms of temporal probability. As an example, the probability of encountering a bridge known to exist at a given location is very close to (or equal to) 1, while the probability to encounter a construction crane is less than 1 if outside of the planned construction period. In this particular case, the probability distribution is unsymmetrical in that the probability of encountering the crane after the planned construction period is higher than the probability of encountering the crane before the planned construction period.

In a particular aspect, for flying objects detected in a certain airspace, the probability of encountering the flying objects in another airspace volume (other than the detection space) depends on the intent of the flying objects. For example, the change of position of a flock of birds detected in the area of a migratory route can be estimated accurately over a relatively long period of time, whereas the change of position may not be capable of being estimated accurately for an individual bird close to the ground, such when the bird is engaged in hunting.

In a particular aspect, system parameters of the vehicle 102 are conditioned based on the probability functions associated with obstacles. In an illustrative example, the travel control system 132 is configured to slow down travel of the vehicle 102 in a space-time volume with higher collision probability. In a particular aspect, tailored probability distributions are used. In an example, a probability distribution for a tall building scheduled to be constructed accounts for the likelihood that construction of the building begins behind schedule rather than ahead of schedule.

In a particular aspect, the obstacle database 120 is updated relatively frequently during travel and is compiled from many sources, including both proprietary and public domain information, such as: JEPPESEN® (registered trademark of BOEING DIGITAL SOLUTIONS, INC., Chicago, IL) obstacle databases; real-time information from other, cooperative vehicles, manned and unmanned, piloted and autonomous; weather data, where "severe weather warnings" are interpreted as obstacles, acquired from a multiplicity of sources, such as the National Oceanic and Atmospheric Association (NOAA); geographical data, such as the United States Geographical Survey "National Elevation Dataset" of the U. S. Department of the Interior and the "Terrain and Obstacles Data" of the Federal Aviation Administration; and other relevant data omni-acquisition/crawling, including private databases of satellite and street-view imagery, social media, weather forecasts, animal migratory routes information, etc.

In a particular aspect, obstacle database information is specific for the on-board sensors 104 of the vehicle 102. In an example in which the sensors 104 include a synthetic aperture radar-based obstacle detection system, the known obstacle database 120 is formatted appropriately to accelerate the removal of "known" radar echo information from the dataset of potential hazards based on the sensor data 106.

In a particular aspect, blockchain-based trust mechanisms are implemented for security and credibility of the obstacle database 120. In a particular aspect, the obstacle database 120 is compatible with geofencing, such as with geofenced space being assigned the collision probability of one. In a particular aspect, the obstacle database 120 on-board the vehicle 102 stores a subset of data, relevant for a particular mission, from a more comprehensive obstacle database, and automatic updates are provided through a communications link with the vehicle 102 as such updates become relevant and available.

In a particular aspect, the intent of any detected observed uncooperative objects and of any unexpected cooperative objects is evaluated to assign a probability of encountering the objects elsewhere. For example, an obstacle identified as a flock of migratory birds is likely to maintain its course and altitude over a reasonable time, and the probability of encountering the flock along the predicted trajectory is relatively high.

In a particular aspect, the obstacle database 120 contains information about suitable emergency flight termination locations in, or close to, the mission area, such as sites appropriate for possible emergency landing or destruction. Such information includes operation-critical data, such as prevalent wind direction at the sites, the type of soil or surface and possible overgrowth, etc. The information for a particular site includes the probability data associated with site's important characteristics and data regarding a most recent update of the information, to help to estimate a probability of success of an emergency operation, enabling evaluation of multiple emergency operations to determine an emergency response plan. In an example, in response to an engine failure in a given area, the vehicle 102 elects to glide to a private landing strip that is farther away but that has a lower unsuccessful landing probability, rather than to attempt landing at a nearby forest clearing that was surveyed a year ago because shrubbery or low trees might have grown there since the most recent survey.

In a particular aspect, multiple benefits arise from the addition of a probability parameter (e.g., the probability distributions 124) indicating spatial and temporal likelihoods of safety-related events or of encountering an obstacle in a given segment of airspace. In a particular aspect, the obstacle database 120 has does not explicitly distinguish stationary from non-stationary obstacles. Instead, non-stationary objects corresponding to database entries with diminishing temporal probabilities.

In a particular aspect, management of the obstacle database 120 is simplified by obviating periodic cleanups of the obstacle database 120 due to semi-stationary objects or events. For example, objects or events are associated with diminishing temporal probabilities that tail-off to zero and are thus automatically removed.

In a particular aspect, use of the obstacle database 120 enables improvement or optimization of trajectories, in terms of risk and safety. In a particular aspect, machine learning is implemented to improve the probability distributions associated with the estimation of obstacle coordinates in space and time. Alternatively or in addition, in a particular aspect, machine learning is used for dynamic trajectory generation.

In a particular aspect, the sensor data 106 includes real-world images that are evaluated by machine-learning algorithms to improve the precision of defining obstacle parameters, e.g., positions of man-made obstacles, vegetation coverage area or other phenomena, prevalent migrating bird flock areas, or severity of weather events. In a particular aspect, supervised learning of one or more neural networks are used for obstacle recognition, and reinforcement learning is used for efficient obstacle avoidance and following of flight paths. In a particular aspect, the reinforcement learning process enhances the database content by improving recognition precision and detection probability of obstacles based on systematically acquired sensor data. Database enhancements improve data reliability and reduce the computational effort for onboard obstacle avoidance system, improving operation of the obstacle analysis system 130 and the vehicle 102.

Figure 3:
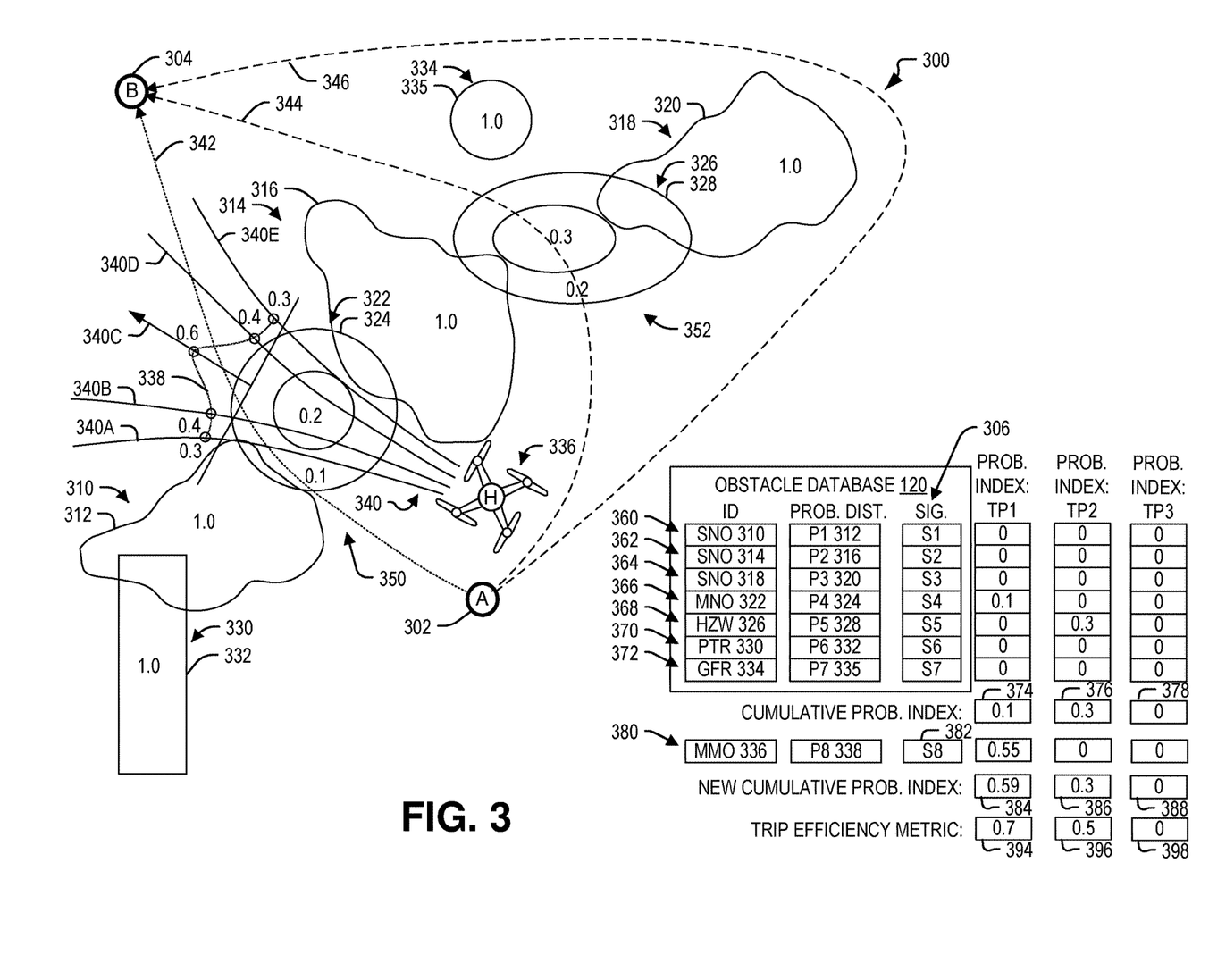
FIG. 3 is a diagram depicting an example of probability-based obstacle avoidance.

FIG. 3 is a diagram depicting an example of probability-based obstacle avoidance by the vehicle 102, including a graphical representation of potential obstacles for travel from location A 302 to destination B 304, and also including an example of data values used by the vehicle 102 for obstacle avoidance.

As illustrated, a mountain chain stands between location A 302 and destination B 304. Obstacles 310, 314, and 318 are portions of the mountain chain that cannot be overflown by the vehicle 102 and correspond to stationary natural objects (SNOs). Obstacle 310 is represented by a probability distribution 312, obstacle 314 is represented by a probability distribution 316, and obstacle 318 is represented by a probability distribution 320. Each of the probability distributions 312, 316, and 320 has a value of 1.0 (e.g., certainty of encounter) within the respective spatial area depicted for that obstacle and has a value of 0.0 (e.g., certainty of no encounter) outside of the spatial area. The obstacles 310, 314, and 318 (also referred to as "mountains" 310, 314, and 318, respectively) are separated by valleys 350 and 352 through which the vehicle 102 can cross the mountain chain. In this example, only spatial probabilities are considered, and collision probabilities are discrete, to facilitate the presentation of the concept.

Obstacle 322 (also referred to as "birds 322") represents extensive bird breeding grounds in parts of valley 350. A probability distribution 324 represents estimated probabilities of collision with birds and includes a center portion having a value of 0.2, an outer portion having a value of 0.1, and is 0 elsewhere.

Obstacle 326 (also referred to as "winds 326") represents strong, gusty winds in the valley 352. A probability distribution 328 represents estimated probabilities of vehicle crash due to the winds and includes a center portion having a value of 0.3, an outer portion having a value of 0.2, and is 0 elsewhere.

Obstacle 330 represents prohibited travel region which the vehicle 102 is prohibited from entering. A probability distribution 332 represents boundaries of the region, with a value of 1.0 inside the region, and is 0 outside the region.

Obstacle 334 represents a geo-fenced region which the vehicle 102 is prohibited from entering. A probability distribution 335 represents boundaries of the geo-fenced region, with a value of 1.0 inside the region, and is 0 outside the region.

At location A 302, the obstacle database 120 is populated with records of known potential obstacles. Each record corresponds to a particular obstacle and includes an identifier (ID), a probability distribution (PROB. DIST.), and a signature (SIG.) for that obstacle. In the illustrated example, the vehicle 102 includes a radar system and a camera in the sensors 104, and the signatures include at least one of a radar signature or image feature data for efficient comparisons to incoming sensor data 106.

Record 360 corresponds to obstacle 310, which is a stationary natural object (SNO) with probability distribution parameters P1 representing the probability distribution 312 and with signature S1. Record 362 corresponds to obstacle 314, which is a stationary natural object with probability distribution parameters P2 representing the probability distribution 316 and with signature S2. Record 364 corresponds to obstacle 318, which is a stationary natural object with probability distribution parameters P3 representing the probability distribution 320 and with signature S3. Record 366 corresponds to obstacle 322 (e.g., birds), which are mobile natural objects (MNO) with probability distribution parameters P4 representing the probability distribution 324 and with signature S4. Record 368 corresponds to obstacle 326, which is hazardous weather (HZW) with probability distribution parameters P5 representing the probability distribution 328 and with signature S5. Record 370 corresponds to obstacle 330, which is a prohibited travel region (PTR) with probability distribution parameters P6 representing the probability distribution 332 and with signature S6. Record 372 corresponds to obstacle 334, which is a geo-fenced region (GFR) with probability distribution parameters P7 representing the probability distribution 335 and with signature S7.

Prior to detection of an uncooperative drone 336 by the vehicle 102, multiple potential travel paths, illustrated as a first travel path 342, a second travel path 344, and a third travel path 346 have been evaluated and the first travel path 342 is selected to travel to the destination 304. An illustrative, non-limiting example of evaluating each of the travel paths (TPs) 342, 344, and 346 includes evaluating, for each of the travel paths 342, 344, and 346, a probability index (PROB. INDEX) indicating the probability of encountering each of the obstacles along that particular travel path. For example, the first travel path 342 has a 0.1 probability of encountering the birds 322 and a 0 probability of encountering each of the other obstacles, the second travel path has a 0.3 probability of encountering the winds 326 and a 0 probability of encountering each of the other obstacles, and the third travel path has a 0 probability of encountering each of the obstacles.

A first cumulative probability index 374 indicating a probability of encountering any obstacle along the first travel path 342 is computed (e.g., by processor 110) and has a value of 0.1. A second cumulative probability index 376 indicating a probability of encountering any obstacle along the second travel path 344 is computed (e.g., by processor 110) and has a value of 0.3. A third cumulative probability index 378 indicating a probability of encountering any obstacle along the third travel path 346 is computed (e.g., by processor 110) and has a value of 0.0. In a particular example, the cumulative probability index for a travel path is computed based on a sum of the probabilities that the vehicle 102 will not encounter each of the known obstacles while traveling along that travel path. In an example, the cumulative probability index is computed based on $1 - \Pi_{i \in DB}(1 - PI_i)$ where i represents an obstacle in the obstacle database 120, $PI_i$ represents the probability index for obstacle i, and $\Pi_{i \in DB}( )$ represents the product over all obstacles in the obstacle database 120.

Although the third travel path 346 has the lowest cumulative probability index, an additional determination (e.g., by processor 110) can indicate that the length of the third travel path 346 exceeds available fuel or power resources for the vehicle 102. For example, factors such as estimated travel time and fuel consumption are incorporated into a trip efficiency metric for each of the travel paths, with the first travel path 342 having a trip efficiency metric 394 of 0.7, the second travel path 344 having a trip efficiency metric 396 of 0.5 (due to being slightly longer and therefore less efficient than the first travel path 342), and the third travel path 346 having a trip efficiency metric 398 of 0 (due to being too long for the available fuel). As a result, the first travel path 342 is selected (e.g., by processor 110) based on a combination of having a relatively low-magnitude cumulative probability index 374 and the highest trip efficiency metric 394.

In response to detecting the drone 336, the obstacle analysis system 130 on-board the vehicle 102 determines a signature 382 of the drone 336, compares the signature 382 to the signatures 306 in the obstacle database 120, and in response to determining that the signature 382 of the drone 336 does match any of the signatures 306 in the obstacle database 120, designates the drone 336 as a potential hazard. The obstacle analysis system 130 analyzes the sensor data 106 and determines that the drone 336 is flying with an apparent intent of crossing the mountain chain through the valley 350, but its planned exact trajectory is unknown.

The obstacle analysis system 130 determines that the most probable trajectory of the drone 336 goes through the center of the valley 350, and the expected distribution of the probability of trajectory deviation is incorporated into an estimated probability distribution 338 for the drone 336. For example, a probability of encountering the drone 336 is 0.3 if the drone 336 follows a first trajectory 340A, 0.4 if the drone 336 follows a second trajectory 340B, 0.6 if the drone 336 follows a third trajectory 340C, 0.4 if the drone 336 follows a fourth trajectory 340D, and 0.3 if the drone 336 follows a fifth trajectory 340E.

The obstacle analysis system 130 creates a new database record 380 corresponding to the drone 336 to add to the obstacle database 120. The drone 336 corresponds to a man-made mobile object (MMO), with parameters P8 representing the probability distribution 338, and with the signature S8 382. The obstacle analysis system 130 calculates probability indices of encountering the drone 336 of 0.55 along the first travel path 342 and 0 along the second travel path 344 and the third travel path 346.

Based on the updated information in the obstacle database 120, the obstacle analysis system 130 calculates a new cumulative probability index 384 of 0.59 for the first travel path 342, a new cumulative probability index 386 of 0.3 for the second travel path 344, and a new cumulative probability index 388 of 0 for the third travel path 346. Based on the updated information in the obstacle database 120, and the trip efficiency metrics 394, 396, and 398, the obstacle analysis system 130 determines to change to the second travel path 344, which is less efficient than the first travel path 342 but has a lower chance of encountering an obstacle while traveling to the destination 304.

Thus, the example illustrates improved unmanned and autonomous vehicle trajectory management efficiency, such as by computing the first cumulative probability index 374 associated with the first travel path 342 and computing a second cumulative probability index 376 associated with the second travel path 344, and determining whether to transition to the second travel path 344 at least partially based on a comparison between the first cumulative probability index 374 and the second cumulative probability index 376. In a particular aspect, the determination of whether to transition to the second travel path 344 is further based on the trip efficiency metric 394, a magnitude of at least one of the first cumulative probability index 374 and the second cumulative probability index 376, the instruction 236 from the human operator 234 of FIG. 2, or any combination thereof.

Figure 4:
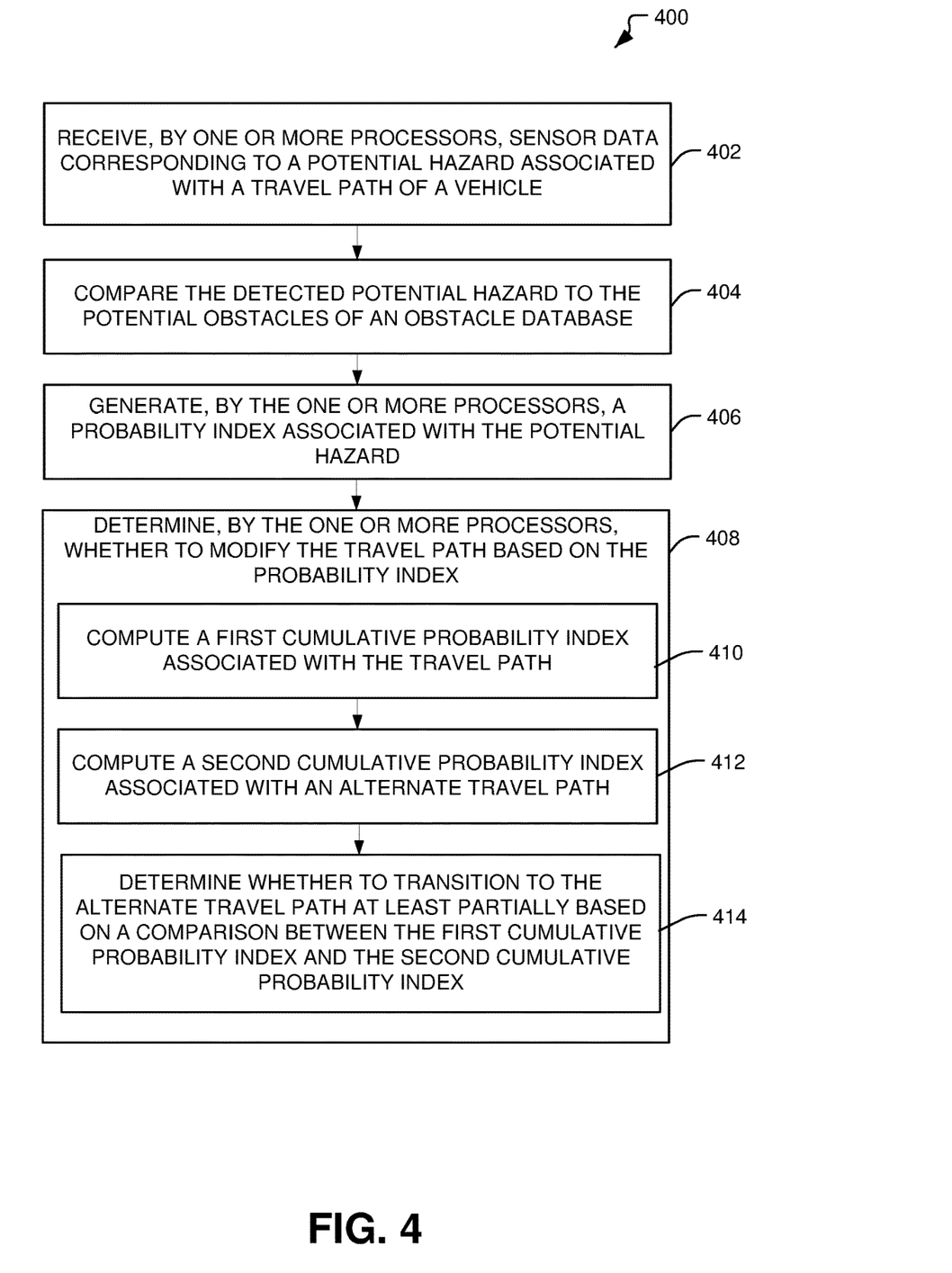
FIG. 4 is a diagram that illustrates a flow chart of an example of a method of probability-based obstacle avoidance.

FIG. 4 illustrates an example of a method 400 for collision avoidance. The method 400 can be performed by the vehicle 102, the one or more processors 110, or by one or more other vehicles, computation devices, or control circuits.

The method 400 includes, at block 402, receiving, by one or more processors, sensor data corresponding to a potential hazard associated with a travel path of a vehicle. For example, the one or more processors 110 receive, via the interface 108, the sensor data 106 corresponding to the potential hazard 150 associated with the travel path 160 of the vehicle 102.

In some implementations, the method 400 includes, at block 404, comparing the detected potential hazard to the potential obstacles of an obstacle database. A probability index associated with the detected potential hazard is generated in response to determining that the detected potential hazard does not match a potential obstacle of the obstacle database. For example, the obstacle analysis system 130 generates the probability index 142 associated with the detected potential hazard 150 in response to determining that the detected potential hazard 150 does not match a potential obstacle 126 of the obstacle database 120.

The method 400 includes, at block 406, generating, by the one or more processors, a probability index associated with the potential hazard, such as the probability index 142 associated with the potential hazard 150. In some implementations, the probability index corresponds to a likelihood of the vehicle encountering the potential hazard along the travel path, such as a likelihood of the vehicle 102 encountering the potential hazard 150 along the travel path 160. In some implementations, the probability index is determined based on a spatial and temporal probability distribution associated with the potential hazard.

The method 400 includes, at block 408, determining, by the one or more processors, whether to modify the travel path based on the probability index. To illustrate, the one or more processors 110 determine, via execution of the obstacle analysis system 130, whether to modify the travel path 160 based on the probability index 142. In some implementations, determining whether to modify the travel path 160 is based at least partially on machine learning.

In some implementations, determining whether to modify the travel path includes, at block 410, computing a first cumulative probability index associated with the travel path, such as the first cumulative probability index 374 associated with the first travel path 342 of FIG. 3. In such implementations, determining whether to modify the travel path includes, at block 412, computing a second cumulative probability index associated with an alternate travel path, such as the second cumulative probability index 376 associated with the second travel path 344, and determining, at block 414, whether to transition to the alternate travel path at least partially based on a comparison between the first cumulative probability index and the second cumulative probability index. In some implementations, determining whether to transition to the alternate travel path is further based on a trip efficiency metric, such as the trip efficiency metric 394, a magnitude of at least one of the first cumulative probability index and the second cumulative probability index, an instruction from a human operator, such as the instruction 236 from the human operator 234 of FIG. 2, or any combination thereof.

Figure 5:
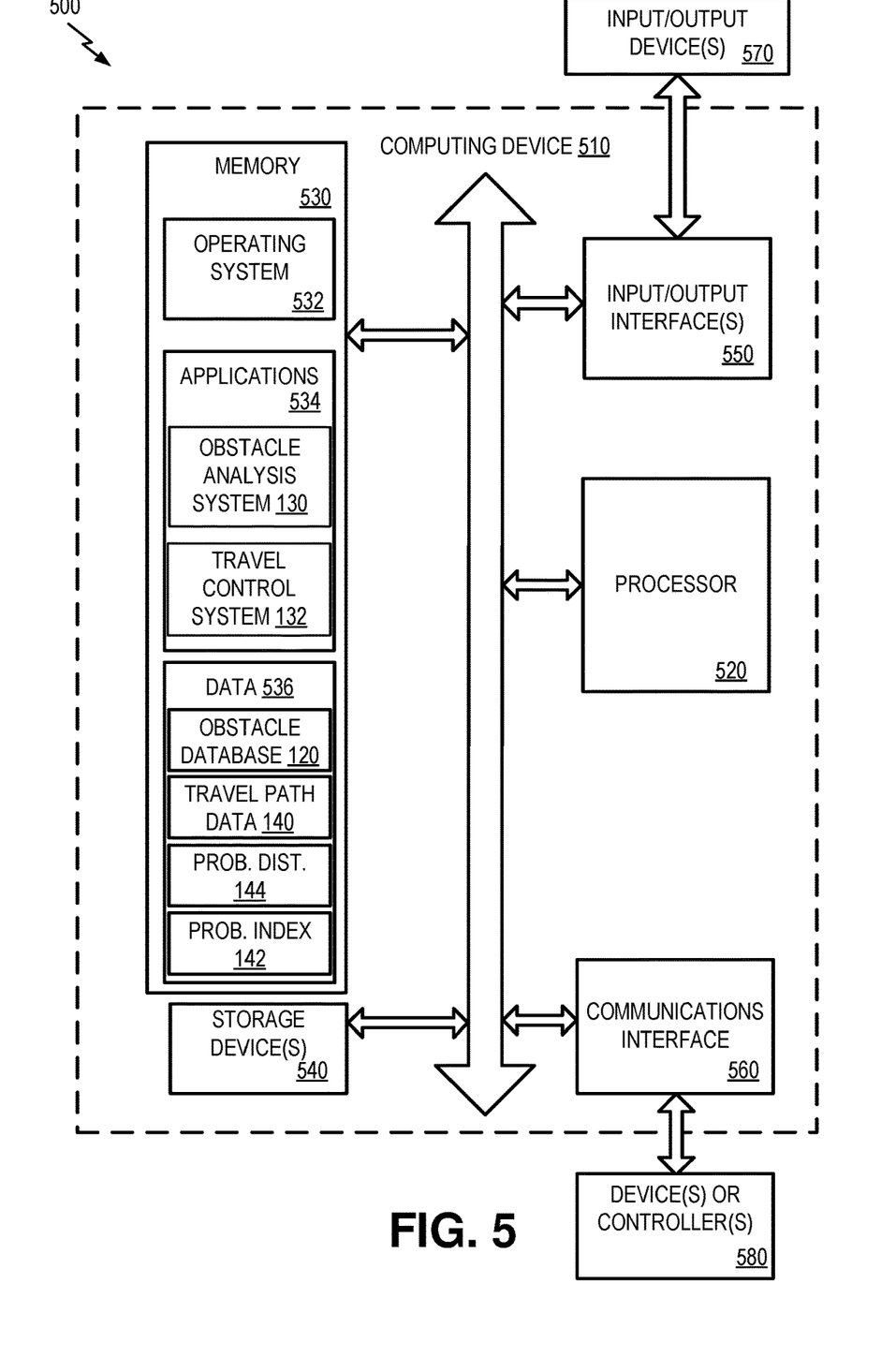
FIG. 5 is a block diagram of a computing environment including a computing device configured to support aspects of computer-implemented methods and computer-executable program instructions or code according to the subject disclosure.

FIG. 5 is a block diagram of a computing environment 500 including a computing device 510 configured to support aspects of computer-implemented methods and computer-executable program instructions or code according to the subject disclosure. For example, the computing device 510, or portions thereof, is configured to execute instructions to initiate, perform, or control one or more operations described with reference to FIGS. 1-4. In some implementations, the computing device 510 includes components of vehicle 102. For example, the computing environment 500 can correspond to the system 100 of FIG. 1.

The computing device 510 includes one or more processors 520. The processors 520 are configured to communicate with system memory 530, one or more storage devices 540, one or more input/output interfaces 550, one or more communications interfaces 560, or any combination thereof. The system memory 530 includes volatile memory devices e.g., random access memory RAM devices, nonvolatile memory devices e.g., read-only memory ROM devices, programmable read-only memory, and flash memory, or both. The system memory 530 stores an operating system 532, which can include a basic input/output system for booting the computing device 510 as well as a full operating system to enable the computing device 510 to interact with users, other programs, and other devices. The system memory 530 stores data 536, such as the obstacle database 120, the stored travel path data 140, the probability distribution 144, the probability index 142, or a combination thereof.

The system memory 530 includes one or more applications 534 e.g., sets of instructions executable by the processors 520. As an example, the one or more applications 534 include instructions executable by the processors 520 to initiate, control, or perform one or more operations described with reference to FIGS. 1-4. To illustrate, the one or more applications 534 include instructions executable by the processors 520 to initiate, control, or perform one or more operations described with reference to obstacle analysis system 130, the travel control system 132, or a combination thereof.

In a particular implementation, the system memory 530 includes a non-transitory, computer-readable medium storing the instructions that, when executed by the processors 520, cause the processors 520 to initiate, perform, or control operations to perform part or all of the functionality described above. For example, the instructions can be executable to implement one or more of the operations or methods of FIGS. 1-4. To illustrate, the instructions of the applications 534, when executed by the processors 520, can cause the processors 520 to initiate, perform, or control operations to perform probability-based collision avoidance. The operations include receiving sensor data corresponding to a potential hazard associated with a travel path of a vehicle. The operations include generating a probability index associated with the potential hazard. The operations include determining whether to modify the travel path based on the probability index. In some implementations, part or all of one or more of the operations or methods of FIGS. 1-4 can be implemented by one or more processors e.g., one or more central processing units CPUs, one or more graphics processing units GPUs, one or more digital signal processors DSPs executing instructions, by dedicated hardware circuitry, or any combination thereof.

The one or more storage devices 540 include nonvolatile storage devices, such as magnetic disks, optical disks, or flash memory devices. In a particular example, the storage devices 540 include both removable and non-removable memory devices. The storage devices 540 are configured to store an operating system, images of operating systems, applications e.g., one or more of the applications 534, and program data e.g., the program data 536. In a particular aspect, the system memory 530, the storage devices 540, or both, include tangible computer-readable media. In a particular aspect, one or more of the storage devices 540 are external to the computing device 510.

The one or more input/output interfaces 550 enable the computing device 510 to communicate with one or more input/output devices 570 to facilitate user interaction. For example, the one or more input/output interfaces 550 can include a display interface, an input interface, a sensor interface, such as the interface 108, or a combination thereof. The processors 520 are configured to communicate with devices or controllers 580 via the one or more communications interfaces 560. For example, the one or more communications interfaces 560 can include a network interface. The devices or controllers 580 can include, for example, a receiver, a transmitter, one or more other devices, or any combination thereof, such as to enable communication with the human operator 234 of FIG. 2.

In conjunction with the described systems and methods, an apparatus is disclosed that includes means for receiving sensor data corresponding to a potential hazard associated with a travel path of a vehicle. In some implementations, the means for receiving sensor data corresponding to a potential hazard associated with a travel path of a vehicle corresponds to the one or more sensors 104, the interface 108, the one or more processors 110, the vehicle 102, the communications interface 560, the input/output interfaces 550, the computing device 510, one or more other devices configured to receive sensor data, or a combination thereof.

The apparatus includes means for generating a probability index associated with the potential hazard. In some implementations, the means for generating a probability index associated with the potential hazard corresponds to the obstacle analysis system 130, the obstacle database 120, the one or more processors 110, the vehicle 102, the processor 520, the computing device 510, one or more other devices configured to process the data to generate a probability index associated with the potential hazard, or a combination thereof.

The apparatus includes means for determining whether to modify the travel path based on the probability index. In some implementations, the means for determining whether to modify the travel path based on the probability index corresponds to the obstacle analysis system 130, the obstacle database 120, the one or more processors 110, the vehicle 102, the processor 520, the computing device 510, one or more other circuits or devices configured to determine whether to modify the travel path based on the probability index, or a combination thereof.

Further, the disclosure comprises embodiments according to the following clauses:

Clause 1. A system 100, comprising: an interface 108 configured to receive sensor data 106 corresponding to a potential hazard 150 associated with a travel path 160 of a vehicle 102; an obstacle database 120 including probability distributions 124 of potential obstacles 126; and one or more processors 110 coupled to the interface 108, the one or more processors configured to: generate a probability index 142 associated with the potential hazard 150; and determine whether to modify the travel path 160 based on the probability index 142 and the probability distributions 124.

Clause 2. The system 100 of clause 1, wherein the probability index 142 corresponds to a likelihood of the vehicle 102 encountering the potential hazard 150 along the travel path 160.

Clause 3. The system 100 of clause 2, wherein the probability index 142 is determined based on a spatial and temporal probability distribution 144 associated with the potential hazard 150.

Clause 4. The system 100 of any of clauses 1 to 3, wherein the one or more processors 110 are configured to apply machine learning to determine a probability distribution 144 associated with the potential hazard 150.

Clause 5. The system 100 of any of clauses 1 to 4, wherein the one or more processors 110 are configured to apply machine learning to determine whether to modify the travel path 160.

Clause 6. The system 100 of any of clauses 1 to 5, wherein the one or more processors 110 are configured to, responsive to determining that the potential hazard 150 does not match any of the potential obstacles 126 of the obstacle database 120: compute a first cumulative probability index 374 associated with the travel path 342; compute a second cumulative probability index 376 associated with an alternate travel path 344; and determine whether to transition to the alternate travel path 344 at least partially based on a comparison between the first cumulative probability index 374 and the second cumulative probability index 376.

Clause 7. The system 100 of clause 6, wherein the one or more processors 110 are configured to determine whether to transition to the alternate travel path 344 further based on a trip efficiency metric 394, a magnitude of at least one of the first cumulative probability index 374 and the second cumulative probability index 376, an instruction 236 from a human operator 234, or any combination thereof.

Clause 8. The system 100 of any of clauses 1 to 7, further comprising the vehicle 102 and one or more sensors 104, the one or more sensors 104 configured to generate the sensor data 106, and wherein the interface 108, the obstacle database 120, the one or more sensors 104, and the one or more processors 110 are integrated into the vehicle 102.

Clause 9. The system 100 of any of clauses 1 to 8, wherein the vehicle 102 comprises an air-based vehicle 102.

Clause 10. The system 100 of any of clauses 1 to 9, wherein the one or more processors 110 are further configured to: compare a signature 382 of the potential hazard 336 to signatures 306 of the potential obstacles 126; and in response to determining that the signature 382 of the potential hazard 336 does not match any of the signatures 306 of the potential obstacles 126, generate the probability index 142 associated with the detected potential hazard 336.

Clause 11. The system 100 of clause 10, wherein the potential obstacles 126 correspond to at least one of: a stationary natural object 310, a stationary manmade object 152, a mobile natural object 322, a mobile manmade object 336, hazardous weather 326, a geofenced region 334, or a prohibited travel region 330.

Clause 12. A method, comprising: receiving, by one or more processors 110, sensor data 106 corresponding to a potential hazard 150 associated with a travel path 160 of a vehicle 102; generating, by the one or more processors 110, a probability index 142 associated with the potential hazard 150; and determining, by the one or more processors 110, whether to modify the travel path 160 based on the probability index 142.

Clause 13. The method of clause 12, wherein the probability index 142 corresponds to a likelihood of the vehicle 102 encountering the potential hazard 150 along the travel path 160.

Clause 14. The method of clause 13, wherein the probability index 142 is determined based on a spatial and temporal probability distribution 144 associated with the potential hazard 150.

Clause 15. The method of any of clauses 12 to 14, wherein determining whether to modify the travel path 160 is based at least partially on machine learning.

Clause 16. The method of any of clauses 12 to 15, wherein determining whether to modify the travel path 342 comprises: computing a first cumulative probability index 374 associated with the travel path 342; computing a second cumulative probability index 376 associated with an alternate travel path 344; and determining whether to transition to the alternate travel path 344 at least partially based on a comparison between the first cumulative probability index 374 and the second cumulative probability index 376.

Clause 17. The method of clause 16, wherein determining whether to transition to the alternate travel path 344 is further based on a trip efficiency metric 394, a magnitude of at least one of the first cumulative probability index 374 and the second cumulative probability index 376, an instruction 236 from a human operator 234, or any combination thereof.

Clause 18. The method of any of clauses 12 to 17, further comprising comparing a signature 382 of the potential hazard 336 to signatures 306 of potential obstacles 126 in an obstacle database 120, and wherein the probability index 142 associated with the potential hazard 336 is generated in response to determining that the signature 382 of the potential hazard 336 does not match any of the signatures 306 of the potential obstacles 126.

Clause 19. A non-transitory, computer-readable medium 530 storing instructions 534 that, when executed by a processor 520, cause the processor 520 to initiate, perform, or control operations comprising: receiving sensor data 106 corresponding to a potential hazard 150 associated with a travel path 160 of a vehicle 102; generating a probability index 142 associated with the potential hazard 150; and determining whether to modify the travel path 160 based on the probability index 142.

Clause 20. The non-transitory, computer-readable medium of clause 19, wherein the probability index 142 is determined based on a spatial and temporal probability distribution 144 associated with the potential hazard 150.

The illustrations of the examples described herein are intended to provide a general understanding of the structure of the various implementations. The illustrations are not intended to serve as a complete description of all of the elements and features of apparatus and systems that utilize the structures or methods described herein. Many other implementations can be apparent to those of skill in the art upon reviewing the disclosure. Other implementations can be utilized and derived from the disclosure, such that structural and logical substitutions and changes can be made without departing from the scope of the disclosure. For example, method operations can be performed in a different order than shown in the figures or one or more method operations can be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results can be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features can be grouped together or described in a single implementation for the purpose of streamlining the disclosure. Examples described above illustrate but do not limit the disclosure. It should also be understood that numerous modifications and variations are possible in accordance with the principles of the subject disclosure. As the following claims reflect, the claimed subject matter can be directed to less than all of the features of any of the disclosed examples. Accordingly, the scope of the disclosure is defined by the following claims and their equivalents.

What is claimed is:

1. A system, comprising:
    an interface configured to receive sensor data corresponding to a potential hazard associated with a travel path of a vehicle;
    an obstacle database including probability distributions of potential obstacles, wherein each probability distribution of the probability distributions identifies an estimated spatial probability of the vehicle encountering a corresponding potential obstacle; and
    one or more processors coupled to the interface and configured to:
        compare the sensor data to potential obstacles of the obstacle database;
        generate a probability index associated with the potential hazard; and
        determine whether to modify the travel path based on the probability index and the probability distributions.

2. The system of claim 1, wherein the probability index corresponds to a likelihood of the vehicle encountering the potential hazard along the travel path.

3. The system of claim 2, wherein the probability index is determined based on a spatial and temporal probability distribution associated with the potential hazard.

4. The system of claim 1, wherein the one or more processors are configured to apply machine learning to determine a corresponding probability distribution associated with the potential hazard.

5. The system of claim 1, wherein the one or more processors are configured to apply machine learning to determine whether to modify the travel path.

6. The system of claim 1, wherein the one or more processors are configured to, responsive to determining that the potential hazard does not match any of the potential obstacles of the obstacle database:
    compute a first cumulative probability index associated with the travel path;
    compute a second cumulative probability index associated with an alternate travel path; and determine whether to transition to the alternate travel path at least partially based on a comparison between the first cumulative probability index and the second cumulative probability index.

7. The system of claim 6, wherein the one or more processors are configured to determine whether to transition to the alternate travel path further based on a trip efficiency metric, a magnitude of at least one of the first cumulative probability index or the second cumulative probability index, an instruction from a human operator, or any combination thereof.

8. The system of claim 1, further comprising the vehicle and one or more sensors, the one or more sensors configured to generate the sensor data, and wherein the interface, the obstacle database, the one or more sensors, and the one or more processors are integrated into the vehicle.

9. The system of claim 8, wherein the vehicle comprises an air-based vehicle.

10. The system of claim 1, wherein the one or more processors are further configured to:
  compare a signature of the potential hazard to signatures of the potential obstacles; and
  in response to determining that the signature of the potential hazard does not match any of the signatures of the potential obstacles, generate the probability index associated with the potential hazard.

11. The system of claim 10, wherein the potential obstacles correspond to at least one of: a stationary natural object, a stationary manmade object, a mobile natural object, a mobile manmade object, hazardous weather, a geofenced region, or a prohibited travel region.

12. A method, comprising:
  receiving, by one or more processors, sensor data corresponding to a potential hazard associated with a travel path of a vehicle;
  comparing the sensor data to potential obstacles of an obstacle database that includes probability distributions of potential obstacles, wherein each probability distribution of the probability distributions identifies an estimated spatial probability of the vehicle encountering a corresponding potential obstacle;
  generating, by the one or more processors, a probability index associated with the potential hazard; and
  determining, by the one or more processors, whether to modify the travel path based on the probability index.

13. The method of claim 12, wherein the probability index corresponds to a likelihood of the vehicle encountering the potential hazard along the travel path.

14. The method of claim 13, wherein the probability index is determined based on a spatial and temporal probability distribution associated with the potential hazard.

15. The method of claim 12, wherein determining whether to modify the travel path is based at least partially on machine learning.

16. The method of claim 12, wherein determining whether to modify the travel path comprises:
  computing a first cumulative probability index associated with the travel path;
  computing a second cumulative probability index associated with an alternate travel path; and
  determining whether to transition to the alternate travel path at least partially based on a comparison between the first cumulative probability index and the second cumulative probability index.

17. The method of claim 16, wherein determining whether to transition to the alternate travel path is further based on a trip efficiency metric, a magnitude of at least one of the first cumulative probability index and the second cumulative probability index, an instruction from a human operator, or any combination thereof.

18. The method of claim 12, further comprising comparing a signature of the potential hazard to signatures of the potential obstacles of the obstacle database, and wherein the probability index associated with the potential hazard is generated in response to determining that the signature of the potential hazard does not match any of the signatures of the potential obstacles.

19. A non-transitory, computer-readable medium storing instructions that, when executed by a processor, cause the processor to initiate, perform, or control operations comprising:
  receiving sensor data corresponding to a potential hazard associated with a travel path of a vehicle;
  comparing the sensor data to potential obstacles of an obstacle database that includes probability distributions of potential obstacles, wherein each probability distribution of the probability distributions identifies an estimated spatial probability of the vehicle encountering a corresponding potential obstacle;
  generating a probability index associated with the potential hazard; and
  determining whether to modify the travel path based on the probability index.

20. The non-transitory, computer-readable medium of claim 19, wherein the probability index is determined based on a spatial and temporal probability distribution associated with the potential hazard.

* * * * *